US008345962B2

(12) United States Patent
Yu et al.

(10) Patent No.: US 8,345,962 B2
(45) Date of Patent: Jan. 1, 2013

(54) TRANSFER LEARNING METHODS AND SYSTEMS FOR FEED-FORWARD VISUAL RECOGNITION SYSTEMS

(75) Inventors: Kai Yu, Santa Clara, CA (US); Wei Xu, Los Gatos, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 1056 days.

(21) Appl. No.: 12/277,504

(22) Filed: Nov. 25, 2008

(65) Prior Publication Data

US 2009/0141969 A1 Jun. 4, 2009

Related U.S. Application Data

(60) Provisional application No. 60/991,071, filed on Nov. 29, 2007.

(51) Int. Cl.
*G06K 9/62* (2006.01)

(52) U.S. Cl. .......................... 382/157; 382/156; 382/158
(58) Field of Classification Search .................. None
See application file for complete search history.

(56) References Cited

U.S. PATENT DOCUMENTS

| 5,872,864 | A * | 2/1999 | Imade et al. ................. 382/176 |
| 2002/0174079 | A1 * | 11/2002 | Mathias et al. ................ 706/15 |
| 2008/0260212 | A1 * | 10/2008 | Moskal et al. ................ 382/118 |

* cited by examiner

*Primary Examiner* — Amir Alavi
*Assistant Examiner* — Kenny Cese
(74) *Attorney, Agent, or Firm* — Joseph Kolodka; Bao Tran

(57) ABSTRACT

A method and system for training a neural network of a visual recognition computer system, extracts at least one feature of an image or video frame with a feature extractor; approximates the at least one feature of the image or video frame with an auxiliary output provided in the neural network; and measures a feature difference between the extracted at least one feature of the image or video frame and the approximated at least one feature of the image or video frame with an auxiliary error calculator. A joint learner of the method and system adjusts at least one parameter of the neural network to minimize the measured feature difference.

11 Claims, 3 Drawing Sheets

US 8,345,962 B2

TRANSFER LEARNING METHODS AND SYSTEMS FOR FEED-FORWARD VISUAL RECOGNITION SYSTEMS

RELATED APPLICATIONS

This application claims the benefit of U.S. Provisional Application No. 60/991,071, filed Nov. 29, 2007, the entire disclosure of which is incorporated herein by reference.

FIELD

The present disclosure relates to visual recognition systems. More particularly, the present disclosure relates to training methods and systems for neural networks of visual recognition systems, which use transfer learning methods.

BACKGROUND

Visual recognition systems take images or video frames as inputs, and output labels indicating semantic categories of the input images. Such systems have wide applications, including but not limited to face recognition, object recognition, scene classification, and hand-written recognition. Many state-of-the-art visual recognition systems use hierarchical feed-forward neural networks, also referred to as deep neural networks, whose parameters are trained based on training examples (e.g., images, video frames) labeled by human labelers. Usually a neural network for visual recognition is a very complex system, containing an input layer, multiple hidden layers, and an output layer, often with tens of thousands, or even millions, of parameters to be determined through a training procedure.

In practice, the amount of training data is usually limited and expensive to obtain due to labeling costs. Consequently, it is very difficult to train such a complex learning system, thus, recognition accuracy is often far from satisfactory.

A traditional way to determine the parameters is by supervised training based on provided labeled examples. To guarantee a good performance, this method requires a large number of training examples that are usually expensive to obtain. Moreover, this method does not really improve the recognition accuracy by using human domain knowledge and unlabeled data.

A pre-training strategy has been suggested which puts the neural network as an encoder part of an encoder-decoder network and which enforces the hidden features of the neural network that can be used to recover the input data by going through a decoder procedure. After this pre-training phase, the encoder part is further trained, usually by a supervised training procedure. Since the pre-training phase does not require labeled data, the approach makes use of unlabeled data to pre-train the network, and thus offers a good initialization of the parameters. However, the method needs to train an additional decoder network, which is used by the recognition system in the end. Furthermore, the approach does not use the human domain knowledge.

Accordingly, a method and system is needed which uses domain knowledge and unlabeled data to train a neural network of a visual recognition system.

SUMMARY

A method is disclosed herein for training a neural network of a visual recognition computer system. The method comprises the steps of: extracting at least one feature of an image or video frame; approximating the at least one feature of the image or video frame with the neural network; measuring a feature difference between the extracted at least one feature of the image or video frame and the approximated at least one feature of the image or video frame; and adjusting at least one parameter of the neural network to minimize the measured feature difference.

Also disclosed herein is a system for training a neural network of a visual recognition computer system. The system comprises: a feature extractor for extracting at least one feature of an image or video frame; an auxiliary output layer provided in the neural network for approximating the at least one feature of the image or video frame; an auxiliary error calculator for measuring a feature difference between the extracted at least one feature of the image or video frame and the approximated at least one feature of the image or video frame; and a joint learner for adjusting at least one parameter of the neural network to minimize the feature difference.

DETAILED DESCRIPTION OF THE INVENTION

Disclosed herein is a visual recognition system comprising a hierarchical feed-forward neural network trained by a method, that in addition to requiring a network to produce predictions as close as possible to labels assigned by a person on training (labeled) examples, adds an auxiliary learning task that places onto the network an auxiliary output layer, and requires its outputs to fit some features computed from input data by a feature extractor. Because the auxiliary learning task does not require any human labeling, it can utilize the massive amount of unlabeled data to train the network. Furthermore, because the feature extractor is designed to encode some human domain knowledge, the system is effectively regularized by this useful information. The training method and system disclosed herein overcomes the shortage of labeled examples for training a complex neural network, and can greatly improve the recognition accuracy.

Figure 1:
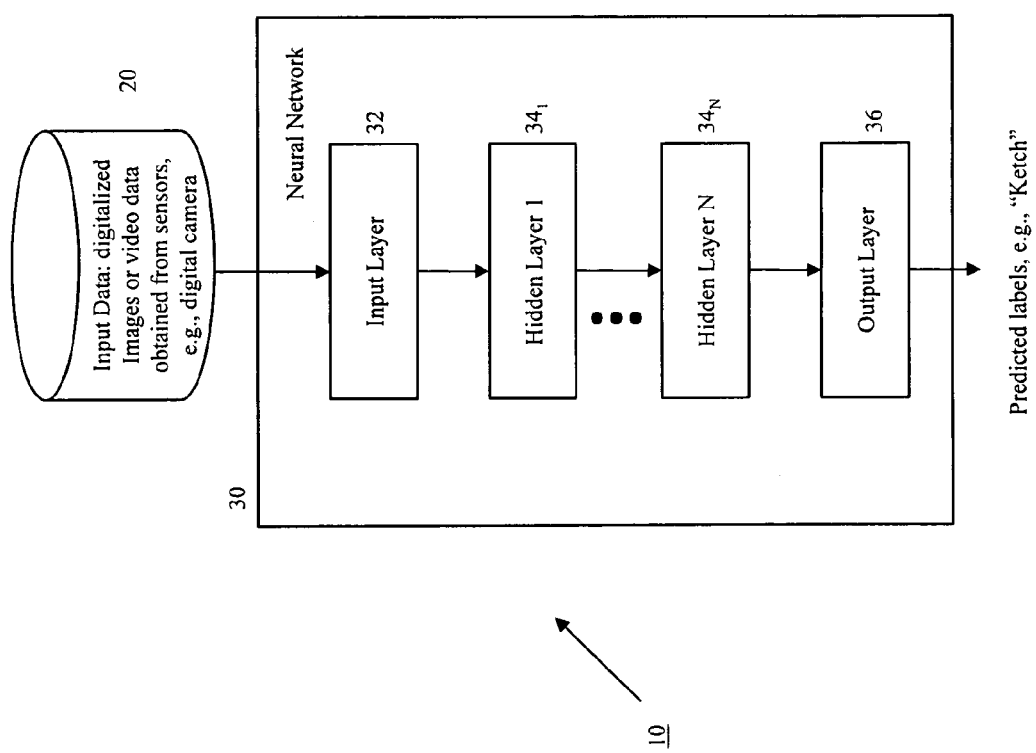
FIG. 1 is a block diagram of an embodiment of a visual recognition system according to the present disclosure.

FIG. 1 is a block diagram of an embodiment of a visual recognition system 10 according to the present disclosure. The system 10 includes a database 20 and a hierarchial feed-forward neural network (HFFNN) 30 in communication with the database 20.

The database 20 stores input digitalized images and/or video frames (images) of objects or scenes to be recognized or classified. The images stored in the database 20 may be obtained from one or more digital cameras or other types of sensors or combination of sensors that are capable of generating the images to be recognized or classified.

The HFFNN 30 conventionally includes an input layer 32, a plurality of hidden layers $34_1$, $34_N$, and an output layer 36. As is well known in the art, data moves through the HFFNN 30 in a forward direction, from input layer 32, through the hidden layers $34_1$, $34_N$ and to the output layer 36.

The HFFNN 30 processes the images stored in the database 20 and outputs a class label for each processed image. More specifically, the input layer 32 performs any necessary data preprocessing on the digital input images (e.g., image normalization and any other physical and/or digital image transformations). Each hidden layer $34_1$, $34_N$ performs nonlinear data transformation, thereby distilling useful features for the next-step or layer data processing. The output layer 36 receives as its input, the output from the last hidden layer $34_N$ and performs a decision making step to predict a class label (e.g., in a vector form) for each corresponding input image.

Figure 2:
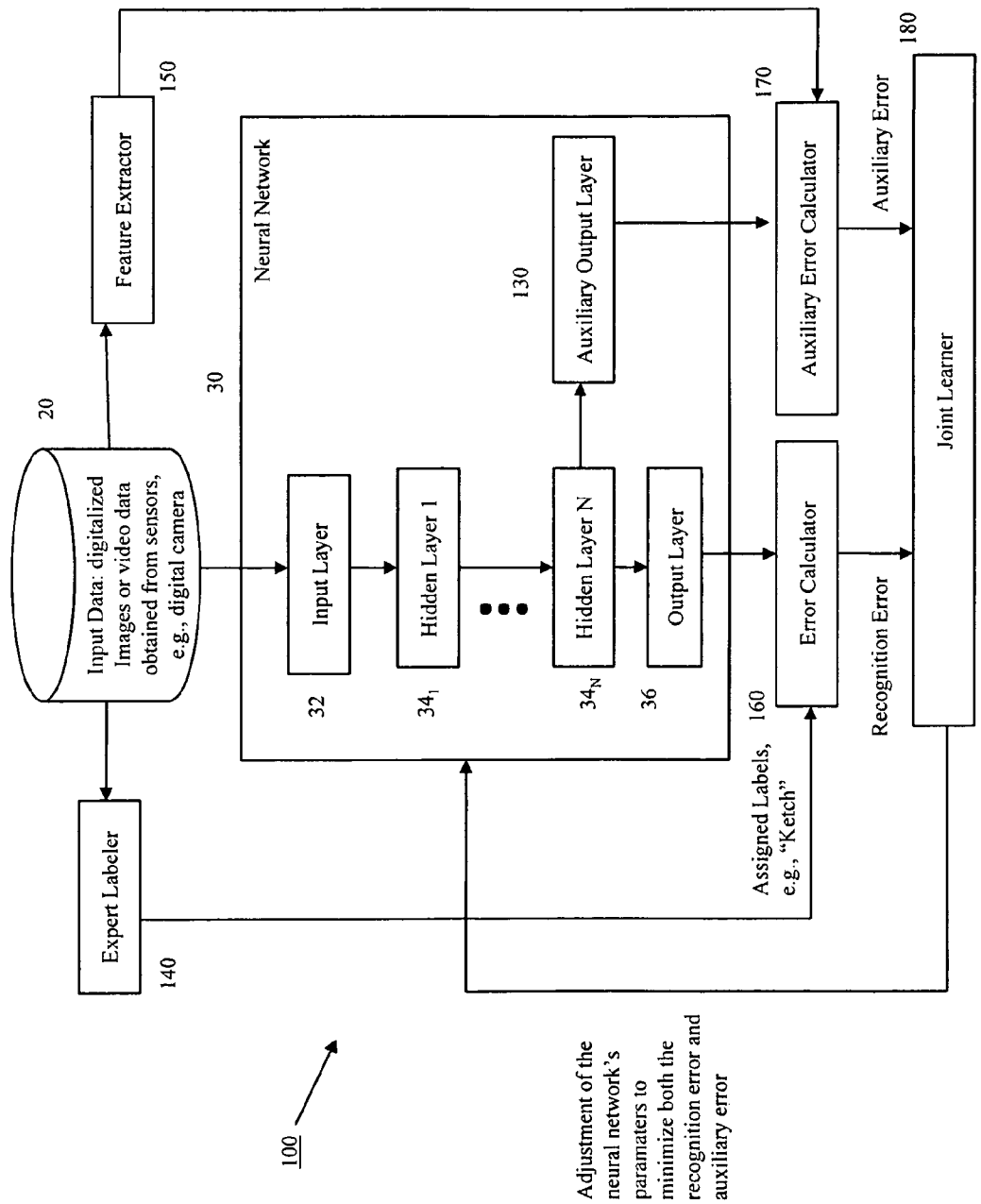
FIG. 2 is a block diagram of an embodiment of a training system for training a hierarchial feed-forward neural network (HFFNN), according to the present disclosure.

FIG. 2 is a block diagram of an embodiment of a training system 100 for training the hierarchial feed-forward neural network (HFFNN) 30 of the visual recognition system 10 of FIG. 1, according to the present disclosure.

The training system 100 comprises a database 120, an auxiliary output layer 130, an expert labeler 140, a feature extractor 150, an error calculator 160, an auxiliary error calculator 170, and a joint learner 180.

The database 120 stores input training digitalized images and/or video frames (training images) of objects or scenes to be recognized or classified. The database 120 may be database 20 of the visual recognition system 10 of FIG. 1, or a different database. The training images stored in the database 120 may be obtained from one or more digital cameras or other types of sensors or combination of sensors that are capable of generating training images of objects or scenes to be recognized or classified. The one or more digital cameras may be the one or more digital cameras of the visual recognition system 10 of FIG. 1, or be different cameras.

During training, the HFFNN 30 processes each of the training images stored in the database 120 and outputs a class label for each training image. More specifically, the input layer 32 performs any necessary data preprocessing on each inputted training image. Each hidden layer $34_1$, $34_N$ performs nonlinear data transformation, thereby distilling useful features for the next-step or layer data processing. The output layer 36 receives as its input, the output from the last hidden layer $34_N$ and performs a decision making step to predict a class label (e.g., in a vector form) for each inputted training image.

The HFFNN 30 is modified to include the auxiliary layer 130. In FIG. 2, the auxiliary layer 130 is adapted and configured within the HFFNN 30 to receive input from hidden layer $34_N$. In other embodiments, the auxiliary layer 130 may be adapted configured within the HFFNN 30 to receive input from any of the hidden layers. In some embodiments, the auxiliary output layer 130 may receive input from the output layer 36, as long as the path from input layer 32 to the output layer 36 and the path from the input layer 32 to the auxiliary output layer 130 pass through one or more of the same hidden layers. The auxiliary output layer 130 performs a decision making step that can approximate one or more relevant training image features actually computed by the feature extractor 150 of the corresponding training image, as will be described further on.

The expert labeler 140 allows a first supervised learning task to be performed by the training system 100. The expert labeler 140 graphically displays the training images stored in the database 120 and allows a human expert or other suitable labeler, to label or assign each displayed training image with a class label. The labels at the output of the expert labeler 140 (e.g., in a vector form) will be used by the training system to adjust parameters of the HFFNN 30 so it may approximate a function, which accurately classifies or recognizes the input training images. The expert labeler 140 may be implemented using any well known or suitable expert labeling method including without limitation software implemented methods, hardware implemented methods and combinations thereof.

The feature extractor 150 allows a second supervised learning task to be performed by the training system 100. The feature extractor 150 computes one or more relevant features (e.g., in vector forms) of each input training image stored in the database 120. The relevant image features include, without limitation: 1) visual features computed based on raw pixels, such as but not limited to shape descriptors and appearance descriptors; and 2) features from sources other than raw pixels such as but not limited to textual annotations. The feature extractor 150 is adapted and configured to reflect useful domain knowledge about the recognition task by teaching the HFFNN 30 to behave according to the domain knowledge employed by the feature extractor 150. The feature extractor 150 may be implemented using any well known or suitable feature extraction method including without limitation software implemented methods, hardware implemented methods and combinations thereof. Once the feature extractor 150 is configured and adapted by a human expert or like means about some domain knowledge, it automatically operates on the input training images, without any additional human expert labeling efforts. Therefore, the second supervised learning task performed by the feature extractor 150 utilizes the information of both domain knowledge and unlabeled training images, and transfers the additional information to the recognition task. Due to this extra supervision component of the training system 100, the HFFNN 30 can produce more accurate results.

The error calculator 160 calculates the discrepancy between the class label predicted by the output layer 36 of the HFFNN 30 for each training image and the class label assigned by the human expert for the corresponding training image, via the expert labeler 140. This discrepancy may be referred to as a label discrepancy. The error calculator 160 then produces a label recognition error value at its output corresponding to the label discrepancy.

The auxiliary error calculator 170 calculates the discrepancy between the one or more relevant training image features approximated by the auxiliary output layer 130 of the HFFNN 30 and the one or more relevant features of the corresponding image actually computed by the feature extractor 150. This discrepancy may be referred to as a feature discrepancy. The auxiliary error calculator 170 then produces a feature recognition error value at its output corresponding to the feature discrepancy.

The error calculator 160 and the auxiliary calculator 170 may each be implemented using any well known or suitable error calculation method including without limitation software implemented methods, hardware implemented methods and combinations thereof.

The joint learner 180 receives as its input the corresponding training image label and feature recognition error values produced at the outputs of the error calculator 160 and the auxiliary error calculator 170, respectively. In one non-limiting embodiment, the joint learner comprises a stochastic gradient descent algorithm. The joint learner may also comprise any other suitable optimization algorithm. The joint learner processes this information to adjust or tune parameters of the HFFNN 30 in order to jointly minimize the label and feature recognition error values. In other words, the joint learner ensures that the output layers 36 and 130 of the HFFNN 30 approximate the human assigned class label produced at the output of the expert labeler 140 and one or more relevant image features produced at the output of the feature extractor 150, for a corresponding input training image. The joint learner 180 may be implemented using any well known or suitable expert learning method including without limitation software implemented methods, hardware implemented methods and combinations thereof.

One skilled in the art will recognize that the systems and methods described herein may be implemented on any suitable computer system. The computer system may include, without limitation, a mainframe computer system, a workstation, a personal computer system, a personal digital assistant (PDA), or other device or apparatus having at least one processor that executes instructions from a memory medium.

The computer system may further include a display device or monitor for displaying operations associated with the expert labeler and other systems and methods described herein and one or more memory mediums on which one or more computer programs or software components may be stored. For example, one or more software programs which are executable to perform the methods described herein may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The systems and methods described herein may also be executed in hardware, a combination of software and hardware, or in other suitable executable implementations. The systems and methods implemented in software may be executed by the processor of the computer system or the processor or processors of the one or more associated computers or computer systems connected to the computer system.

Figure 3:
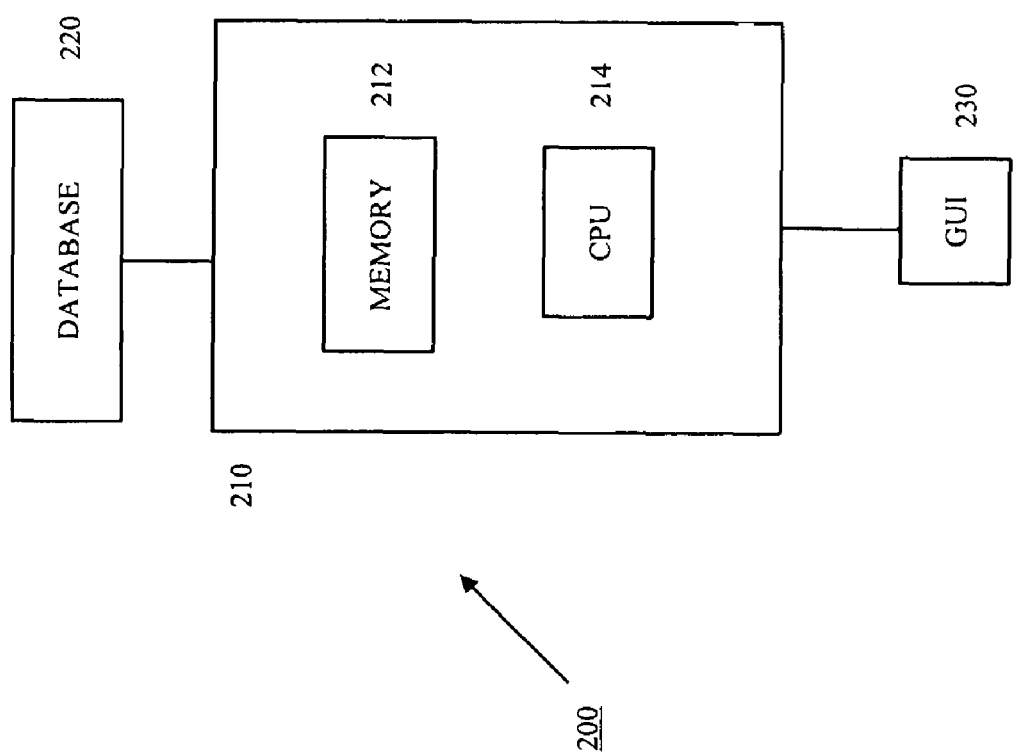
FIG. 3 is a block diagram of an embodiment of a computer system for implementing the systems and methods described herein.

FIG. 3 is a block diagram of an embodiment of a computer system 200 for implementing the systems and methods described herein. The computer system 200 includes one or more processors 210 (only one shown), and a graphical user interface 230. A database 220 is coupled to the one or more processors 210. The processor 210 includes a memory 212 that stores programmed instructions for executing the systems and methods described herein. The processor 210 further includes a Central Processing Unit (CPU) 214 for executing the program instructions, thus making the computer system operative as a visual recognition system.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for training a neural network of a visual recognition computer system, the method comprising the steps of:
    first training the neural network by selecting training image labels of training images stored in a database; and
    supplementing the first training with a second training the neural network on the images by extracting features of each input training images stored in the database, including:
        predicting at least one class label of the image or video frame with the neural network;
        approximating at least one feature of the image or video frame with the neural network;
        determining feature recognition errors by measuring a label difference between the selected training image labels and the predicted at least one class label of the image or video frame, and measuring a feature difference between the extracted at least one feature of the image or video frame and the approximated at least one feature of the image or video frame; and
    jointly learning the selected training image labels and the feature recognition error values; and
    tuning parameters of the neural network to jointly minimize the training image labels and the feature recognition error values.

2. The method of claim 1, further comprising the step of selecting a class label for the training image or video frame.

3. The method of claim 2, wherein the class label selecting step is performed manually by a human expert.

4. The method of claim 1, wherein the class label selecting step is performed manually by a human expert.

5. The method of claim 1, wherein the neural network comprises a hierarchical feedforward neural network.

6. The method of claim 1, wherein the extracting step is performed by a feature extractor.

7. The method of claim 1, wherein the approximating step is performed by an auxiliary output layer of the neural network.

8. A system for training a neural network of a visual recognition computer system, wherein the neural network is trained on, the system comprising:
    a labeler for selecting training image labels of training images stored in a database;
    a feature extractor for extracting at least one feature of each input training images stored in the database;
    an output layer provided in the neural network for predicting at least one class label of the image or video frame;
    an auxiliary output layer provided in the neural network for approximating the at least one feature of the image or video frame;
    an error calculator for measuring a label difference between the selected training image labels and the predicted at least one class label of the image or video frame;
    an auxiliary error calculator for measuring a feature difference between the extracted at least one feature of the image or video frame and the approximated at least one feature of the image or video frame; and
    a joint learner operating on training image labels and the feature recognition error values, the joint learner tuning parameters of the neural network to jointly minimize the training image labels and the feature recognition error values of the error calculator and auxiliary error calculator.

9. The system of claim 8, further comprising an expert labeler for allowing selection of a class label for the training image or video frame.

10. The system of claim 8, wherein the joint learner also adjusts the at least one parameter of the neural network to minimize the measured label difference.

11. The system of claim 8, wherein the neural network comprises a hierarchical feed-forward neural network.

\* \* \* \* \*